United States Patent [19]

Fivian

[11] 4,142,333

[45] Mar. 6, 1979

[54] GENERATING METHOD FOR GRINDING CYLINDRICAL GEARS

[75] Inventor: Daniel A. Fivian, Horgen, Switzerland

[73] Assignee: Maag Gear-Wheel & Machine Company Limited, Zurich, Sweden

[21] Appl. No.: 828,500

[22] Filed: Aug. 29, 1977

[30] Foreign Application Priority Data

Sep. 15, 1976 [DE] Fed. Rep. of Germany ....... 2641554

[51] Int. Cl.$^2$ .............................................. B24B 1/00
[52] U.S. Cl. ...................................................... 51/287
[58] Field of Search ................. 51/287, 56 G, 95 GH, 51/115, 123 G; 90/9.6

[56] References Cited

U.S. PATENT DOCUMENTS

| | | | |
|---|---|---|---|
| 2,324,182 | 7/1943 | Wildhaber | 51/287 X |
| 2,387,166 | 10/1945 | Miller | 51/287 X |
| 2,910,808 | 11/1959 | Wildhaber | 51/287 X |
| 3,499,252 | 3/1970 | Cleff | 51/123 G |

FOREIGN PATENT DOCUMENTS 313210  5/1956  Switzerland ............................ 51/287

OTHER PUBLICATIONS

D. W. Botstiber, "Basic Gear Grinding Methods", *The Iron Age*, vol. 170, pp. 118-121, 8-7-1952.

*Primary Examiner*—Nicholas P. Godici
*Attorney, Agent, or Firm*—Werner W. Kleeman

[57] ABSTRACT

A generating method and apparatus for grinding cylindrical gears by means of two substantially plate-shaped or dished grinding wheels which machine a right tooth flank and a left tooth flank by means of practically point-shaped contact zones disposed at their related lateral edge. Between the gear and both grinding wheels there is accomplishd a to-and-fro generating motion in relation to the base circle or cylinder of the gear. The connection line between the contact zones of the grinding wheels is maintained at such a spacing from the base circle that in each end or terminal position of the generating motion one grinding wheel machines a tooth tip and at the same time the other grinding wheel machines a tooth root.

3 Claims, 6 Drawing Figures

GENERATING METHOD FOR GRINDING CYLINDRICAL GEARS

BACKGROUND OF THE INVENTION

The present invention relates to a new and improved generating method for grinding cylindrical gears possessing essentially involute-shaped tooth profiles, by means of two substantially plate-shaped or dished grinding wheels which machine a right tooth flank and a left tooth flank by means of practically point-like contact zones dispositioned at their related lateral edge, and wherein there is carried out between the gear and both grinding wheels a to-and-fro generating motion related to the base cylinder or circle of the gear.

According to a prior art method of this species (see e.g. MAAG Taschenbuch, Zürich 1963, Pages 259–268), both of the contact zones are always disposed in a tangential plane at the base cylinder of the workpiece. Due to the generating motion both of the grinding wheels produce an involute tooth profile by means of their contact zones. With this operation, as a general rule, there cannot be avoided a certain over-run of the generating motion, in order to make certain that the contact zones for sure wipingly contact the entire tooth profile. This over-run is present by virtue of the fact that one of both grinding wheels or disks, following the grinding of the tooth tip of a tooth flank, is retracted so as to be spaced from the tooth during the further generating motion, in other words so-to-speak grinds "air", whereas the other grinding wheel still machines the tooth root portion of another tooth flank. Such over-run must be accepted in practically all situations, since it is extremely seldom and only incidentally happens during the design of the gear teeth that there is simultaneously machined a tooth tip and a tooth root by a respective grinding wheel. Consequently, it was heretofore necessary to work with a generating stroke larger than that which corresponds to the actual length of the tooth profile.

SUMMARY OF THE INVENTION

Hence, with the foregoing in mind it is a primary object of the present invention to provide a new and improved generating method and apparatus for grinding cylindrical gears, which is not associated with the aforementioned drawbacks and limitations of the prior art proposals.

Another and more specific object of the present invention aims at maintaining as small as possible or completely avoiding the aforementioned over-run of the generating motion.

Still a further significant object of the present invention is to provide a generating method for grinding cylindrical gears in a highly efficient, reliable and economical manner.

Yet a further important object of this invention aims at the provision of apparatus for grinding cylindrical gears while employing a generating method, which apparatus is relatively simple in construction and design, economical to manufacture, extremely efficient and reliable in operation, not readily subject to breakdown or malfunction, and requires a minimum of maintenance and servicing.

Now in order to implement these and still further objects of the invention, which will become more readily apparent as the description proceeds, the method of the present invention, which is of the character previously described, is manifested by the features that the connection line between the contact zones of both grinding wheels or disks is maintained at such a spacing from the base cylinder that in each end position of the generating motion one grinding wheel machines or works a tooth tip and at the same time the other grinding wheel machines or works a tooth root.

By virtue of these operations there is not only obtained a minimum generating stroke, but furthermore there can be also increased the number of generating strokes per unit of time and at the same time the feed in the lengthwise direction of the teeth. It is in fact even possible to completely avoid such over-run, so that the grinding forces exerted upon the work-piece due to its continuous contact with the grinding wheels or disks are practically mutually compensated, thereby avoiding errors in the tooth profile.

A further advantage of the invention resides in the fact that due to the arrangement of the contact zones externally of the base cylinder-tangential plane, the grinding angle of attack or action between the tooth profile and the grinding wheels continuously changes during the generating motion and therefore the theoretical grinding point migrates along the grinding wheel profile. This means that the cutting capability of the grinding wheels is increased and there is obtained an increased grinding efficiency.

At the tooth profile the disposition of the contact zones externally of the base cylinder-tangential plane causes a slight deviation from the involute. This deviation is compensated by superimposing other deviations which result from the varying speeds along the tooth profile during the relative movement between the gear and the grinding wheels, this relative movement occurring during the generating motion. Consequently, the accuracy of the tooth profile is increased.

The heretofore conventional tooth profile corrections, e.g. the insetting of the tooth tip- and/or tooth root portions, can be accomplished in the same manner and with the same means as with the state-of-the-art methods of the same species.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Describing now the drawings, it will suffice for the purpose of explaining the underlying concepts of the invention to imagine a gear having very small tooth width, wherein during the grinding operation there is not required any movement in the lengthwise direction of the teeth of such gear.

Figure 1:
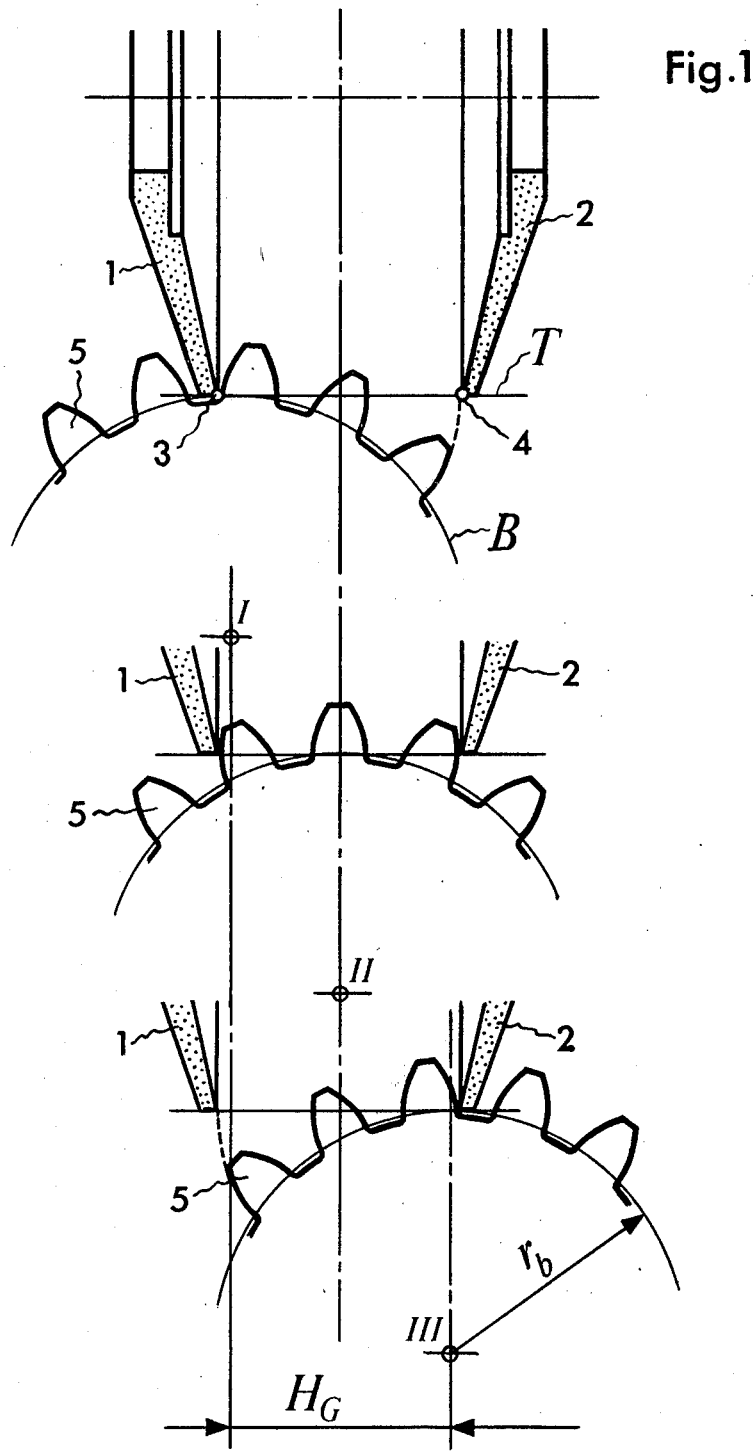
FIG. 1 schematically illustrates three generating positions as occur when carrying out a prior art generating-grinding method.

With the heretofore known methods there operate two grinding wheels or disks 1 and 2 which can be arranged at an inclination or, according to the showing of FIG. 1, parallel to one another, having very small contact zones 3 and 4 which are located at a tangential plane T to the base circle or cylinder B having the radius $r_b$. In the uppermost portion of the showing of FIG. 1 the grinding wheel or disk 1 begins to grind the tooth root of a left tooth flank of a gear 5 which is located in the left terminal position I of a generating stroke $H_G$. The grinding wheel or disk 2 is located relatively far outside of its engagement with the gear 5. In an intermediate position II of the generating stroke $H_G$ (intermediate portion of the showing of FIG. 1) both of the grinding wheels 1 and 2 are in engagement with the intermediate part of the left tooth flank and the right tooth flank, respectively. In the right terminal or end position III of the generating stroke $H_G$ (lowermost portion of the showing of FIG. 1) the grinding wheel 2 is in engagement with the tooth root to the right tooth flank. But now the grinding wheel 1 is located relatively far out of engagement with the gear 5. The generating stroke $H_G$ is thus appreciably greater than the generating stroke needed for grinding a single tooth profile.

Figure 2:
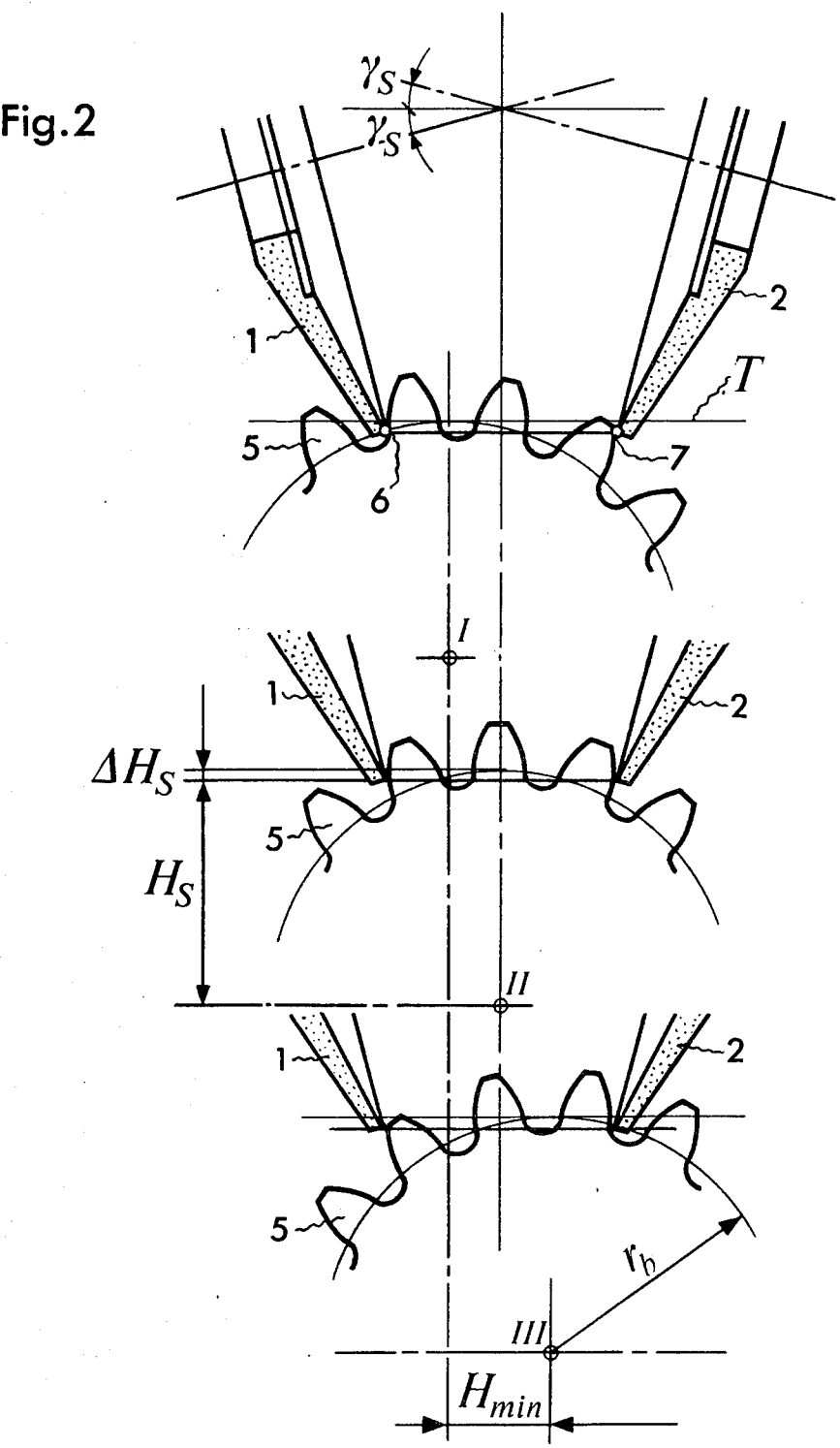
FIG. 2 schematically illustrates three generating positions which are accomplished according to an exemplary embodiment of the inventive method.
Figure 3:
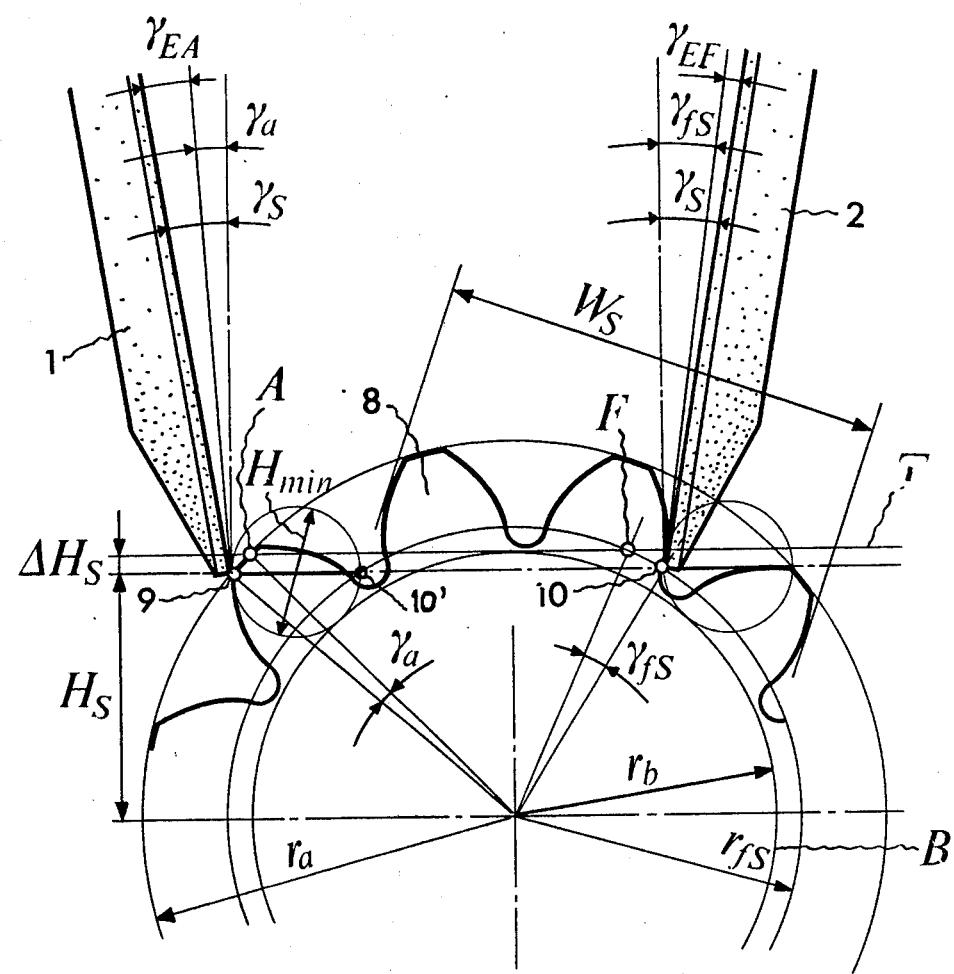
FIG. 3 illustrates the change in the angle of action or attack between the tooth profile and the related grinding wheel or disk during engagement thereof at the tooth tip and the tooth root when performing the method according to FIG. 2.

Now as best seen by referring to FIGS. 2 and 3, with the inventive generating method, the approximately pointlike contact zones 6 and 7 possess a spacing $\Delta H_S$ from the tangential plane T at the base circle-cylinder B. With the illustrated exemplary embodiments of the invention, the connection line between both contact zones 6 and 7 is always dispositioned at the distance or spacing $\Delta H_S$ radially within the tangential plane T and the grinding wheels or disks 1 and 2 are positioned at an inclination relative to one another through an angle $2\gamma_S$. In special situations the angle $\gamma_S$ can be equal to null or even can be negative and the contact zones can be disposed externally of the tangential plane T. The preferred range of the angle $\gamma_S$ is between $+15°$ and $-5°$. In the left end or terminal position I of the gear 5, in other words at the left end of the generating stroke $H_{min}$ the contact zone 6 of the grinding wheel or disk 1 (uppermost position of the showing of FIG. 2) is in engagement with the tooth root or shoulder of a left tooth flank, whereas the contact zone 7 of the grinding wheel or disk 2 is in engagement with the tooth tip of a right tooth flank. In the intermediate showing of FIG. 2 the gear 5 is in the intermediate position II of the generating stroke $H_{min}$, and in this case both of the grinding disks 1 and 2 are in engagement with the intermediate portion of the right tooth flank and the left tooth flank, respectively. In the lower portion of the showing of FIG. 2 the gear 5 is located in the right terminal or end position III of the generating stroke $H_{min}$, where the grinding wheel 1 engages with the tooth tip of the left tooth flank, whereas the grinding wheel 2 engages by means of its contact zone 7 with the tooth root of the right tooth flank.

In FIG. 3 there are shown the engagement conditions which prevail between the grinding wheels or disks 1 and 2 and a larger gear 8 having a smaller number of teeth. The radius of the dedendum circle has been designated by reference character $r_{fS}$, and the radius of the addendum circle of the gear 8 by reference character $r_a$. The point of intersection of the tangential plane T to the base cylinder B with the addendum circle at the left side of the gear 8 has been designated by reference character A, and the corresponding point of intersection at the right side with the grinding-dedendum circle has been designated by reference character F. The grinding-pressure angle or angle of attack at the tooth tip corresponds to the sector angle $\gamma_a$ between the approximately point-shaped contact zone 9 and the point A, the grinding-angle of attack or pressure angle at the tooth root corresponds to the sector angle $\gamma_{fS}$ between the approximately point-shaped contact zone 10 and the point F. The generating stroke $H_{min}$ is equal to the distance 9-10'. These grinding-angles of attack or pressure angles relate to the grinding wheel and the involute tangent (in other words, not to the conventional designation: "pressure angle" as concerns the gear geometry).

The difference of the angles $\gamma_{fS}-\gamma_a$ constitutes the change in the grinding-angle of attack or pressure angle during the generating motion from the tooth root to the tooth tip. The inclined position of the axes of the grinding wheels, set or adjusted at the grinding machine, at the angle $\gamma_S$ can be chosen to be somewhat larger or smaller than the angle of attack at the grinding-dedendum circle. This can be expressed as follows:

$$\gamma_S = \gamma_{fS} + \gamma_{EF} = \gamma_a + \gamma_{EA}$$

or $$\gamma_{EA} = \gamma_{fS} - \gamma_a + \gamma_{EF}$$

wherein: $\gamma_{EA}$ represents the difference between the inclined position angle $\gamma_S$ of the axes of the grinding wheels and the angle of attack $\gamma_a$ of the grinding wheels at the tooth tip, and $\gamma_{EF}$ represents the difference between the inclined position angle $\gamma_S$ of the axes of the grinding wheels and the angle of attack $\gamma_{fS}$ of the grinding wheels.

In the foregoing equations there holds true the following:

$$\gamma_a = \arccos \frac{H_S}{r_a} - \arccos \frac{r_b}{r_a}$$

and $$\gamma_{fS} = \arccos \frac{H_S}{r_{fS}} - \arccos \frac{r_b}{r_{fS}}$$

The actual tooth width has been designated by reference character $W_S$. This corresponds with great approximation to the spacing of both contact zones 9 and 10.

Figure 4:
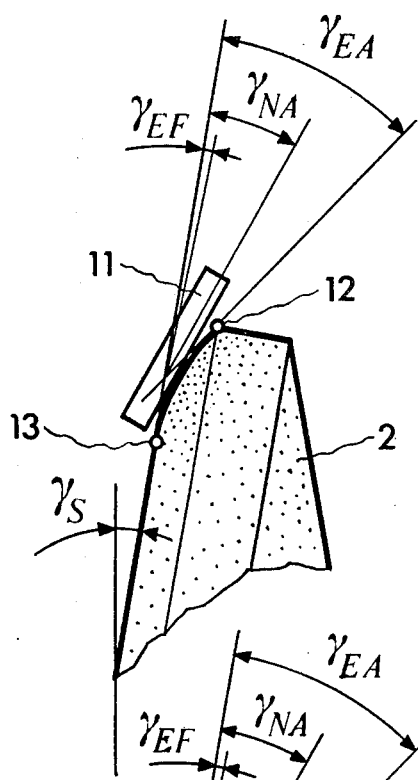
FIG. 4 is a fragmentary view showing a grinding wheel profile for rough grinding.

During rough grinding there is imparted to the grinding wheels or disks, by virtue of the prevailing wear which is shown in exaggerated fashion in FIG. 4, a profile having a rounded edge which deviates from the shape which exists due to the dressing at the end surface and at the outer surface or jacket. A feeler or scanner 11 touches this profile at its intermediate or central region, and it is inclined at the angle $\gamma_{NA}$ to the end surface. This angle $\gamma_{NA}$ is determined from the following equation:

$$\gamma_{NA} = \tfrac{1}{2}(\gamma_{EA} + \gamma_{EF})$$

The point 12 at the profile of the grinding wheel machines the tooth tip portion and the point 13 the tooth root portion, the intermediately disposed points machine the tooth profile portion between the tooth tip and the tooth root owing to the continuous change in the grinding-angle of attack or pressure angle during the generating motion within the boundaries of $\gamma_{fS}$ to $\gamma_a$ and $\gamma_{EA}$ to $\gamma_{EF}$ respectively.

Hence, an appreciably greater number of grinding grains or granules participate in the grinding work than if only one edge of each grinding wheel or disk were operative, something which is favorable with regard to the downtime of the grinding wheels and the machining time.

Figure 5:
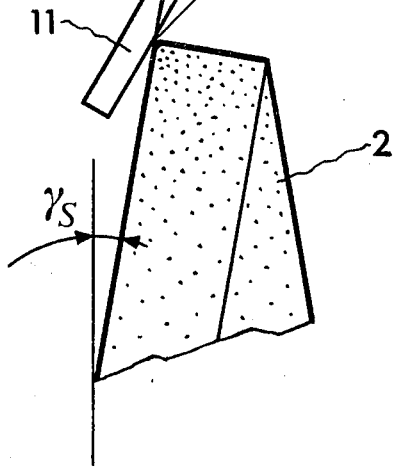
FIG. 5 is a fragmentary view showing a grinding wheel profile for finish grinding.

During finish grinding the grinding wheel profile must be rather sharp, i.e., must only possess a very weak rounded edge which is formed by dressing the end surface and the outer surface or jacket (FIG. 5). The change in the grinding wheel-angle of attack however also brings about that, during finish grinding, there is a slight shifting of the cuttinggrinding granules or grains, so that also during finish grinding the change in the grinding wheel-angle of attack has an advantageous effect during the generating motion.

Figure 6:
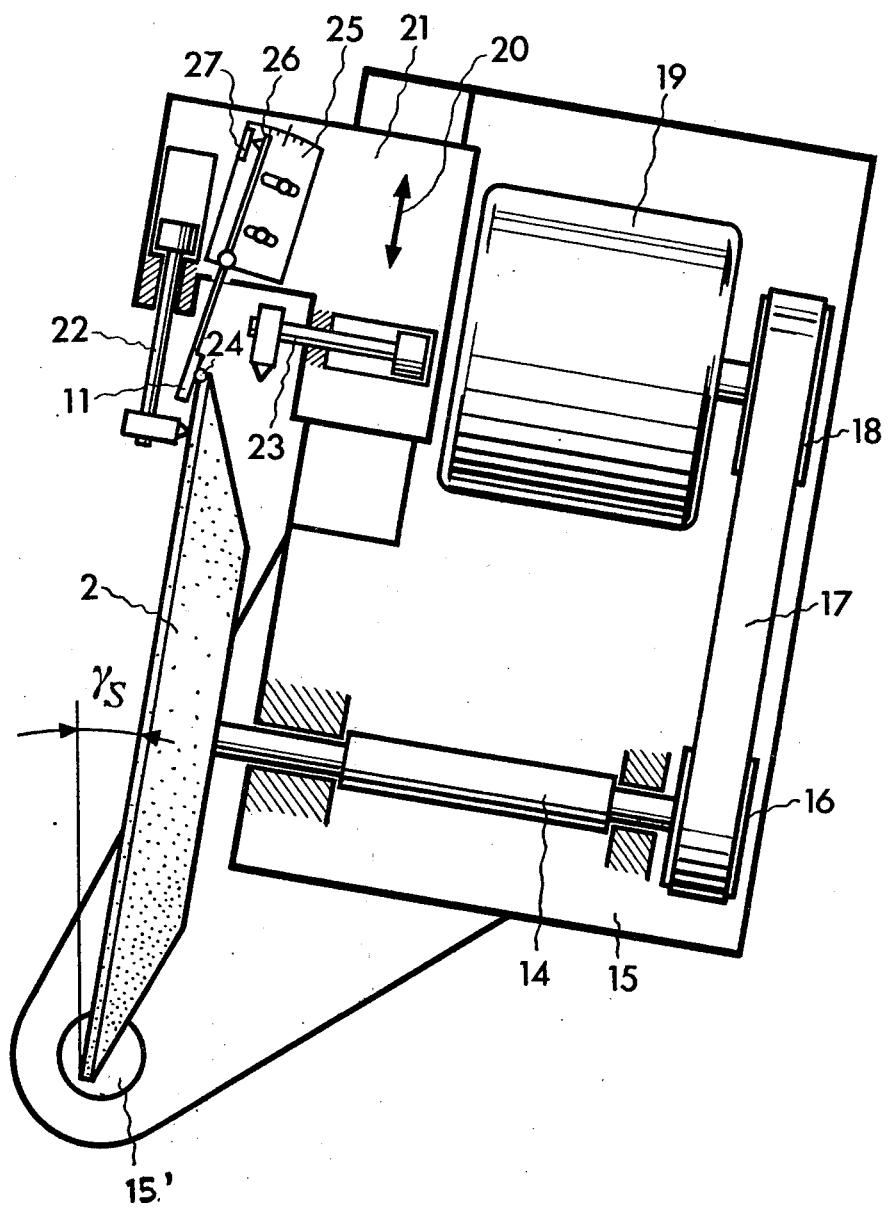
FIG. 6 illustrates the feeler- and dressing devices for one grinding wheel or disk.

The grinding wheel or disk 2, according to the showing of FIG. 6, is seated upon a grinding spindle 14 which is mounted in a grinding support 15 and is driven by a drive motor 19 through the agency of a belt pulley or disk 16, a belt 17 and a belt pulley or disk 18. The grinding support 15 is pivotably mounted about the center of gravity 15' at the region of the grinding points 7 and 10, in order to be able to adjust or set the axes of the grinding wheels at the angle $\gamma_S$. Seated upon a dressing support 21, which is displaceable in the direction of the double-headed arrow 20, is a dressing device 22 which is arranged angularly rigid and serving for dressing the end surface of the grinding wheel or disk 2, and an angularly rigidlyarranged dressing device 23 for the dressing of the jacket or outer surface of such grinding wheel as well as a feeler device 25 which is pivotable about a point 24 located at the region of the upper grinding edge. Belonging to the feeler device 25 is a feeler 11 constructed as a feeler diamond. The feeler 11 is attached to a pivotable feeler lever 26 which indicates its position in conventional manner by means of acontact 27. The grinding spindle 14 is axially positionally readjusted upon wear of the end surface of the grinding wheel 2.

As far as the grinding wheel or disk 1 is concerned there is provided an arrangement which is the mirrorimage of that shown in FIG. 6, and thus, need not be further illustrated.

The adjustment or setting conditions are determined by virtue of the fact that there is chosen a tooth width $W_S$ which is greater or as closely as possible smaller than the ideal tooth width $W_{Sv}$. The ideal tooth width $W_{Sv}$ corresponds, according to the showing of FIG. 3, to a distance along the tangent to the base circle which is bounded by the point of intersection F with the grinding dedendum circle-radius $r_{fS}$ at the one side and the point of intersection A with the addendum circle-radius $r_a$ at the other side. This ideal tooth width $W_{Sv}$ corresponds to a fictitious fractional tooth number k which lies between the aforementioned two boundary points. The actual tooth width $W_S$ corresponds to an integral tooth number k lying between two parallel tangential planes at the oppositely directed tooth flanks, and in the showing of FIGS. 1 to 3 to three teeth. This integral tooth number k can be greater or smaller than the fictitious fractional tooth number.

There is now calculated a characteristic magnitude $k_W = W_s/W_{Sv}$. If this characteristic magnitude or value $K_W$ is greater than 1, then the grinding zones must be shifted below i.e., radially within the base cylinder-tangential plane. If this characteristic value $k_W$ is smaller than 1, then the grinding zones must be placed above, i.e. radially outside of the base cylinder-tangential plane.

The spacing $\Delta H_S$ of the grinding zones from the base cylinder-tangential plane T is derived from the following equations for:

(a) The generating stroke $H_{min} = (r_a^2 - r_{fS}^2)/W_S$ which also corresponds to the path along the parallel lines to the tangent at the base circle at the spacing $\Delta H_S$ which is formed by the point of intersection with the addendum circle and the point of intersection with the grinding-dedendum circle;

(b) The height $H_S$ of the zone of the grinding wheel above the gear axis $$H_S = \sqrt{r_a^2 - \tfrac{1}{4}(W_S + H_{min})^2}$$

The distance $\Delta H_S$ of the grinding zones from the base cylindertangential plane then can be expressed by the following:

$$\Delta H_S = r_b - H_S = r_b - \sqrt{r_a^2 - \tfrac{1}{4}(W_S + \tfrac{r_a^2 - r_{fS}^2}{W_S})^2} \text{ wherein:}$$

$$r_b = \frac{\text{Modulus} \cdot \text{Number of teeth}}{2} \cdot \cos\alpha$$

$\alpha$ = angle of attack or pressure angle of the gear.

The inclined position of the axes of the grinding wheels can be determined according to the equation $$\gamma_{fS} = \arccos\frac{H_S}{r_{fS}} - \arccos\frac{r_b}{r_{fS}},$$

wherein the actual adjustment through the angle $\gamma_{EF}$ can be chosen to be somewhat greater or smaller. As a resultthere is formed the adjustment or setting angle $\gamma_S$. These equations relate to the end plane of the workpiece-gear.

Due to the adjustment of the feeler 11 at the angle $\gamma_{NA}$ such contacts the intermediate zone or region of the grinding wheel profile, with the result that there is possible optimum compensation of deviations from the theoretical involute-tooth profile.

The change in the grinding-angle of attack or pressure angle is dependent upon the number k of teeth located between both of the grinding wheels or disks and the actual tooth width $W_S$ and the displacement or shifting $\Delta H_S$, and can be influenced by selection of the value k.

While there are shown and described present preferred embodiments of the invention, it is to be distinctly understood that the invention is not limited thereto, but may be otherwise variously embodied and practiced within the scope of the following claims.

Accordingly, what I claim is:

1. A generating method for grinding cylindrical gears by means of point generating grinding, comprising the steps of:

providing a gear having teeth which are to be ground, each tooth having a right tooth flank and a left tooth flank;

grinding a right tooth flank and a left tooth flank by means of two substantially plate-shaped grinding wheels by means of practically point-like contact zones dispositioned at a respective lateral edge thereof; p1 carrying out a to-and-fro generating movement between the gear and both grinding wheels and related to the base cylinder of the gear;

maintaining a connection line between the contact zones of the grinding wheels at a spacing from the base cylinder such that in each terminal position of the generating movement one grinding wheel machines a tooth tip and at the same time the other grinding wheel machines a tooth root.

2. A generating method for grinding cylindrical gears, comprising the steps of:

providing a gear having teeth which are to be ground, each tooth having a right tooth flank and a left tooth flank;

grinding a right tooth flank and a left tooth flank by means of two substantially plate-shaped grinding wheels by means of practically point-like contact zones dispositioned at a respective lateral edge thereof;

carrying out a to-and-fro generating movement between the gear and both grinding wheels and related to the base cylinder of the gear;

maintaining a connection line between the contact zones of the grinding wheels at a spacing from the base cylinder such that in each terminal position of the generating movement one grinding wheel machines a tooth tip and at the same time the other grinding wheel machines a tooth root; and wherein, the connection line of the contact zones of both grinding wheels is maintained at a spacing from the base cylinder which is defined by the following equation:

$$\Delta H_S = r_b - \sqrt{r_a^2 - \frac{1}{4}(W_S + \frac{r_a^2 - r_{fS}^2}{W_S})^2}$$

wherein
$r_a$ = radius of the addendum circle
$r_b$ = radius of the base circle
$r_{fS}$ = radius of the dedendum circle decisive for grinding; and
$W_S$ = actual tooth width between the grinding wheels.

3. A generating method for grinding cylindrical gears, comprising the steps of:

providing a gear having teeth which are to be ground, each tooth having a right tooth flank and a left tooth flank;

grinding a right tooth flank and a left tooth flank my means of two substantially plate-shaped grinding wheels by means of practically point-like contact zones dispositioned at a respective lateral edge thereof;

carrying out a to-and-fro generating movement between the gear and both grinding wheels and related to the base cylinder of thegear;

maintaining a connection line between the contact zones of the grinding wheels at a spacing from the base cylinder such that in each terminal position of the generating movement one grinding wheel machines a tooth tip and at the same time the other grinding wheel machines a tooth root;

providing an apparatus having a feeler for feeling the marginal zone of at least one of the grinding wheels;

controlling a dressing operation by means of the feeler;

adjusting the position of the feeler at an angle $\gamma_{NA}$ which is derived from the following equation:

$$\gamma_{NA} = \frac{1}{2}(\gamma_{EA} + \gamma_{EF})$$

wherein, $\gamma_{EA}$ represents the difference between the inclined position angle $\gamma_S$ of the axes of the grinding wheels and the angle of attack $\gamma_a$ of the grinding wheels at the tooth tip, and $\gamma_{EF}$ represents the difference of the inclined position angle $\gamma_S$ of the axes of the grinding wheels and the angle of attack $\gamma_{fS}$ of the grinding wheels.

* * * * *